(12) United States Patent
Bush

(10) Patent No.: US 7,955,083 B2
(45) Date of Patent: Jun. 7, 2011

(54) SYSTEM AND METHOD FOR MODELING ATOMIC STRUCTURES

(75) Inventor: Seth D. Bush, San Luis Obispo, CA (US)

(73) Assignee: California Polytechnic Corporation, San Luis Obispo, CA (US)

( * ) Notice: Subject to any disclaimer, the term of this patent is extended or adjusted under 35 U.S.C. 154(b) by 955 days.

(21) Appl. No.: 11/811,095

(22) Filed: Jun. 8, 2007

(65) Prior Publication Data

US 2008/0305465 A1   Dec. 11, 2008

(51) Int. Cl.
*G09B 23/26* (2006.01)

(52) U.S. Cl. ........................................................ 434/280

(58) Field of Classification Search .................. 434/278, 434/280, 281

See application file for complete search history.

(56) References Cited

U.S. PATENT DOCUMENTS

| 2,140,103 | A | * | 12/1938 | Herbert | 434/280 |
| 3,091,041 | A | * | 5/1963 | Mar Helene | 434/280 |
| 3,423,093 | A | * | 1/1969 | Lahav | 273/282.1 |
| 3,521,380 | A | * | 7/1970 | Ruchlis | 434/280 |
| 3,804,417 | A | * | 4/1974 | Dawson | 273/243 |
| 3,854,223 | A | * | 12/1974 | Dingman, II | 434/278 |
| 4,192,084 | A | * | 3/1980 | O'Riordan | 434/278 |
| 5,071,132 | A | * | 12/1991 | Ward et al. | 273/243 |
| 5,947,745 | A | * | 9/1999 | Tempelman | 434/278 |
| 6,508,652 | B1 | * | 1/2003 | Kestyn | 434/278 |
| 7,048,545 | B2 | * | 5/2006 | McClusky | 434/278 |
| 2002/0072045 | A1 | * | 6/2002 | Possidento | 434/282 |

FOREIGN PATENT DOCUMENTS

GB   1498951   * 1/1978

* cited by examiner

*Primary Examiner* — Kurt Fernstrom

(74) *Attorney, Agent, or Firm* — Martine Penilla & Gencarella, LLP

(57) ABSTRACT

A system and method of an atomic tile including an elemental symbol for a corresponding element and a dot representation of at least one valance electron of the corresponding element. The dot representation are proximate to corresponding edges of the octagonal shape.

10 Claims, 5 Drawing Sheets

SYSTEM AND METHOD FOR MODELING ATOMIC STRUCTURES

BACKGROUND

The present invention relates generally to atomic and molecular modeling, and more particularly, to methods and systems for teaching and demonstrating atomic and molecular models.

Chemistry is typically taught through examination and explanation of common, rudimentary atomic and molecular structures. By way of example, individual atoms such as a silicon atom, and common molecules such as a water molecule, $H_2O$ and an oxygen molecule $O_2$ are often examined.

FIG. 1A is a typical model of a silicon atom 100. The model of the silicon atom 100 illustrates the valence shells 102, 104 of the electrons in the silicon atom. The silicon atom 100 includes twelve electrons shown as small dark circles. The twelve electrons are distributed over the two valence shells 102 and 104. The lower valence shell 102 is filled with eight of the electrons and the higher or outermost valence shell 104 includes four electrons 108.

Each of the atom's valence shells 102, 104 have an affinity for being filled. For many elements (e.g., carbon, oxygen and nitrogen) a filled valence shell contains eight electrons. This is referred to as the "octet" rule. By way of example, the outermost valence shell 104 of the silicon atom 100 has only four electrons rather than a full complement of eight. As a result, the outermost valence shell 104 has an affinity for four additional atoms that can be gained by bonding with other atoms in a covalent bond. Representing an atom with the available valence electrons shown is often referred to as a dot-model of the atom. The dot model can be used to predict that atoms will share valence electrons (with shared electrons "counting" for both atoms) until the atoms have filled their valence shells and therefore can be used to predict which elements will combine to form molecules. By way of example, the silicon atom 100 will want to form covalent bonds with one or more atoms that have a total of four valence electrons available to share with the silicon atom.

Covalent bonding is a chemical theory that states that atoms bond together to form molecules by sharing pairs of electrons. Single bonds involve sharing one pair of valence electrons, double bonds involve sharing two pairs of valence electrons and triple bonds involve sharing three pairs of valence electron. The oxygen molecule and the water molecule can be used to exemplify the concept of covalent bonding.

FIGS. 1B and 1C illustrate typical chemical equations for an oxygen molecule 120 and a water molecule 130, respectively. Referring to FIG. 1B, two oxygen atoms combine to form an oxygen molecule ($O_2$) in a chemical reaction 120. Chemical equation 122 shows the two oxygen atoms and the oxygen molecule 124 in a dot model form showing that each of the oxygen atoms has six valence electrons in its outer valence shell. The oxygen molecule 124 shows that the two pairs of valence electrons 126A and 126B are shared by the two oxygen atoms to provide each of the oxygen atoms with eight electrons in the outermost valence shell.

Referring to FIG. 1C, two hydrogen atoms and an oxygen atom combine to form a molecule of water. Chemical reaction 132 shows the two hydrogen atoms and the oxygen atom combining to form the water molecule 134 in a dot model form. Each of the hydrogen atoms has a single valence electron and the oxygen atom has six valence electrons in its outer valence shell. The water molecule 134 shows that the each one of two pairs of valence electrons 136A and 136B are shared by one of the hydrogen atoms and the oxygen atom to provide the oxygen atom with eight electrons in the outermost valence shell. The covalent bonding also provides each of the hydrogen molecules with a valence shell having two valence electrons.

This manual dot-model is useful in teaching or explaining the basics of chemistry however, because the dot-models are manually formed, many mistakes can occur and can make it more difficult and time consuming as a learning tool. In view of the foregoing, there is a need for a simpler and easier to use and understand system and method for teaching covalent bonding.

SUMMARY

Broadly speaking, the present invention fills these needs by providing a simpler and easier to use and understand system and method for teaching covalent bonding. It should be appreciated that the present invention can be implemented in numerous ways, including as a process, an apparatus, a system, computer readable media, or a device. Several inventive embodiments of the present invention are described below.

One embodiment provides a method of an atomic tile including an elemental symbol for a corresponding element and a dot representation of at least one valance electron of the corresponding element. The dot representation is proximate to corresponding edges of the octagonal shape.

The atomic tile can also include an atomic number corresponding to the element. The atomic tile can also include a point score corresponding to each one of a plurality of valence electron configurations. The plurality of valence electron configurations can include at least one of a single covalent bond, a double covalent bond and a triple covalent bond.

The dot representation of at least one valance electron of the corresponding element includes an open dot representing an available valence electron and a filled dot representing a non-bonding valence electron. The atomic tile can include a predefined geometrical shape. The geometrical shape can have at least one side having a shape capable of being fitted to a second atomic tile. Each of the atomic tile and the second atomic tile can include at least one straight side. The geometrical shape can include an octagonal shape.

Another embodiment provides a method of representing a covalent bond in a molecule including selecting a first atomic tile. The first atomic tile can include an octagonal shape, an elemental symbol for a corresponding element and a dot representation of a valance electron(s) of the corresponding element. The dot representation is proximate to corresponding edges of the octagonal shape. The method further includes determining a number of available valence electrons on the first atomic tile, selecting an edge of the first atomic tile and determining a first number of available valence electrons on the selected edge of the first atomic tile. A subsequent atomic tile having a matching edge having the first number of available valence electrons on at least one edge is selected. The matching edge of the subsequent atomic tile is aligned to the selected edge of the first atomic tile.

The method can also include determining if any subsequent edges of the first atomic tile include at least one available valence electron and selecting the subsequent edge of the first atomic tile with at least one available valence electron.

The method can also include selecting a second subsequent atomic tile having a second matching edge having a number of available valence electrons equal to the at least one available valence electron on the subsequent edge of the first atomic tile and aligning the matching edge of the second subsequent atomic tile to the subsequent edge of the first atomic tile.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a simpler and easier to use and understand system and method for teaching covalent bonding will now be described. It will be apparent to those skilled in the art that the present invention may be practiced without some or all of the specific details set forth herein.

Figure 1A:
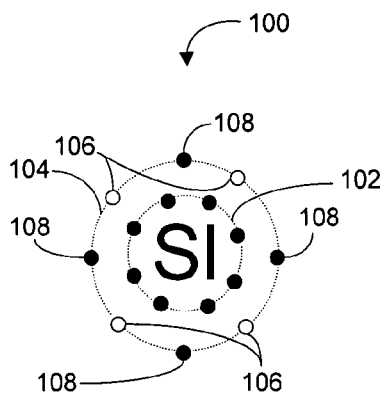
FIG. 1A is a typical model of a silicon atom.
Figure 1B:
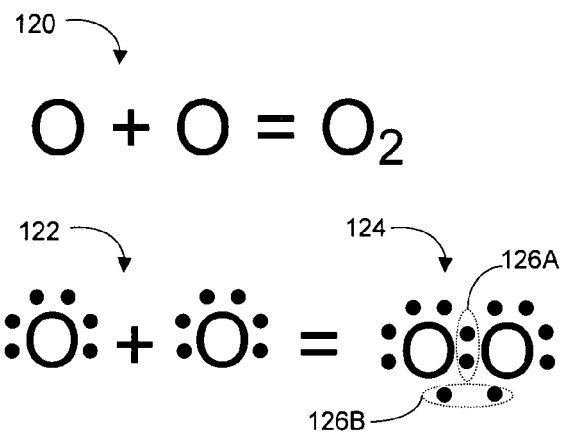
FIGS. 1B and 1C illustrate typical chemical equations for an oxygen molecule and a water molecule, respectively.
Figure 1C:
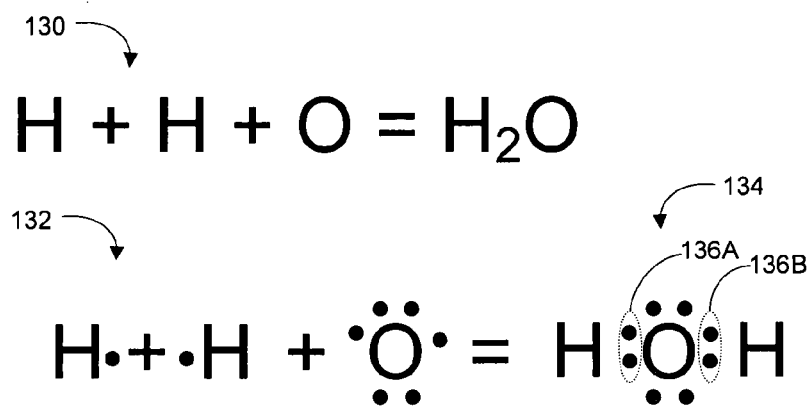
Figure 2:
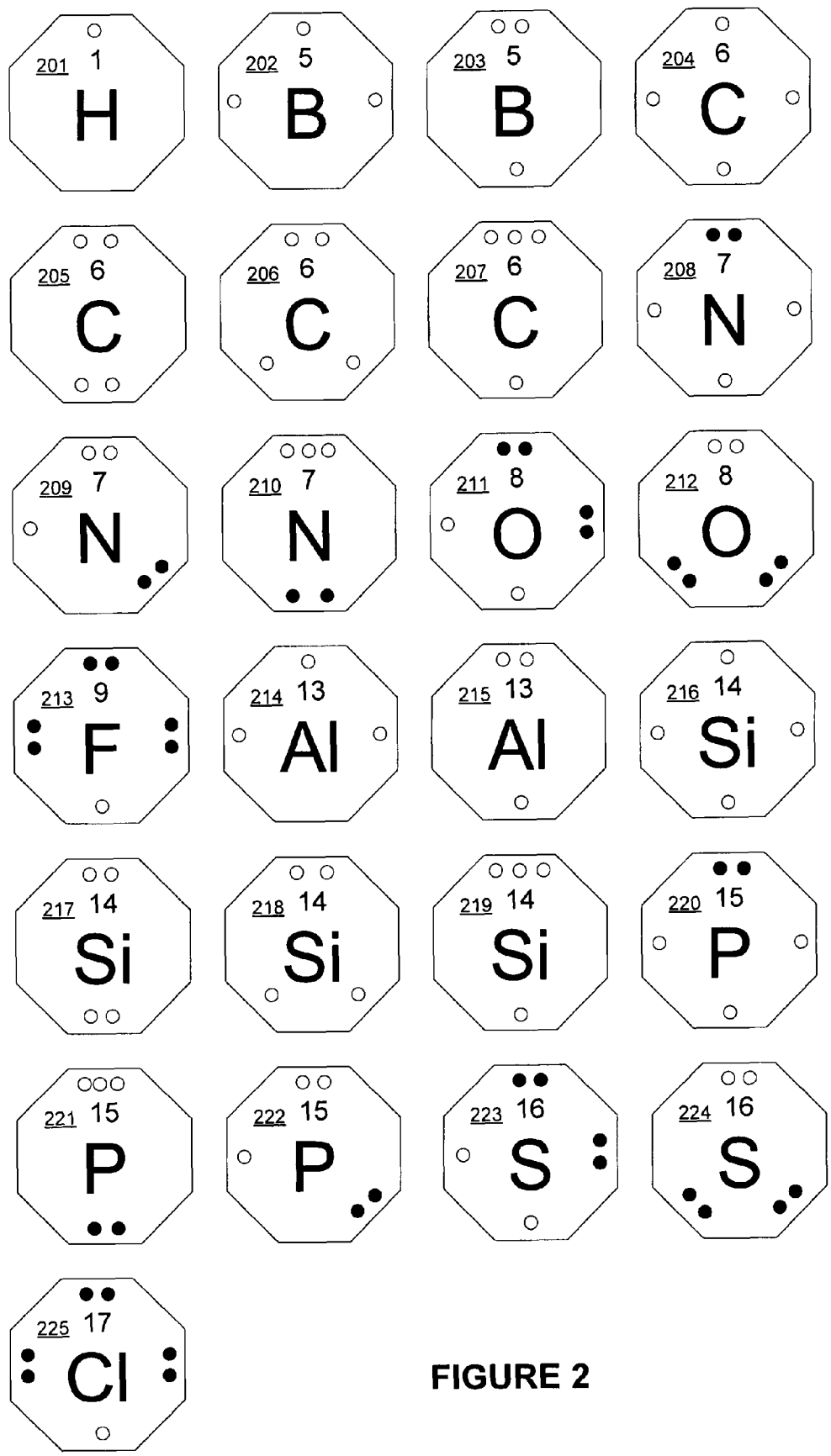
FIG. 2 shows several atomic tiles, in accordance with an embodiment of the present invention.

One embodiment provides atomic tiles that include the respective dot-model for an atom of each element. The atomic tiles are easy to use tools for teaching basic covalent bonding theory. FIG. 2 shows several atomic tiles 201-225, in accordance with an embodiment of the present invention. The atomic tiles 201-225 include the dot-theory representation of the respective atom. The atomic tiles 201-225 can be formed as paper or plastic cards, chips or three-dimensional model. As described in more detail below, the atomic tiles 201-225 can also be shown virtually such as on a display such as a computer display. The atomic tiles 201-225 are shown having an octagonal shape that can correspond to the octet rule. However, it should be understood that alternative shapes could be used (e.g., squares, rectangles, irregular shapes, shapes that can interconnect similar to puzzle pieces or interconnecting building blocks and shapes, etc.)

Each of the atomic tiles 201-225 represents an atom or the respective element and includes the atomic or elemental symbol (e.g. C for carbon tiles 204-207) and the atomic number (e.g. 6 for carbon tiles 204-207) for that element. Each of the atomic tiles 201-225 also includes the respective number of valence electrons for the element (e.g., 4 for carbon tiles 204-207).

The valence electrons are depicted as circles on one or more of the edges of each of the atomic tiles 201-225. An open circle represents a valence electron that can be shared to form a covalent bond. One, two or three open circles may be depicted on any one edge of the tile and will lead to the formation of single, double and triple bonds, respectively.

Filled circle pairs represent non-bonding valence electrons (lone pairs). Each element has a variety of valence electron placements which reflect the different arrangements that element can share electrons in covalent bonds. By way of example, there are four different atomic tiles 204-207 for carbon with different valence electron placements. These different placements include a carbon atom that forms all single bonds (tile 204), all double bonds (tile 205), a double bond and two single bonds (tile 206), or a triple bond and a single bond (tile 207).

Figure 3A:
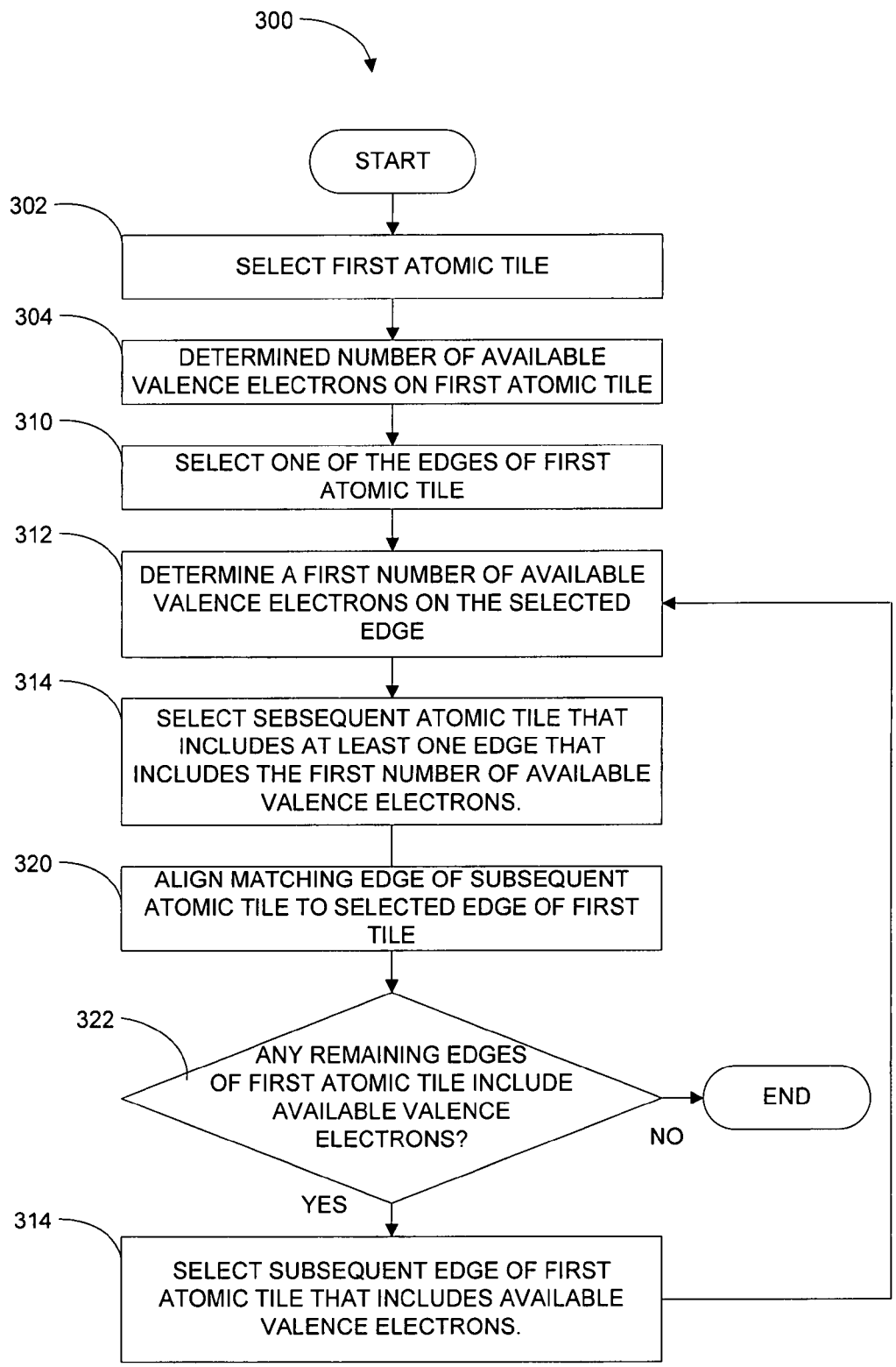
FIG. 3A is a flowchart of the method operations of representing a covalent bond using the atomic tiles, in accordance with an embodiment of the present invention.

FIG. 3A is a flowchart of the method operations 300 of representing a covalent bond using the atomic tiles 201-225, in accordance with an embodiment of the present invention. Covalent bonds can be represented with the atomic tiles 201-225 by matching the open circles of two or more atomic tiles. The one, two or three open circles that appear on the edge of a first tile are matched with one, two or three open circles, respectively, on a second tile. Matching all the open circles on all the atoms in a network forms molecules that follow the dot theory. In an operation 302, a first atomic tile is selected. In an operation 304, the number of available valence electrons on the first atomic tile is determined.

In an operation 310, a first one of the edges of the first atomic tile is selected and in an operation 312, a first number of available valence electrons on the selected edge is determined. In an operation 314, a second atomic tile is selected. The second atomic tile includes at least one matching edge. The matching edge includes the first number of available valence electrons.

In an operation 320, the matching edge of the second atomic tile is aligned with the first edge of the first atomic tile to form a covalent bond between the first atomic tile and second atomic tile.

In an operation 322, the first atomic tile is examined to determine if any of the remaining edges include available valence electrons. If, in operation 322, at least one of the remaining edges of the first atomic tile includes one or more available valence electrons, then in an operation 330, the edge of the first atomic having one or more available valence electrons is selected and the method operation continue in operation 312 above. If, in operation 322, none of the remaining edges of the first atomic tile includes any available valence electrons, then the method operations can end.

Figure 3B:
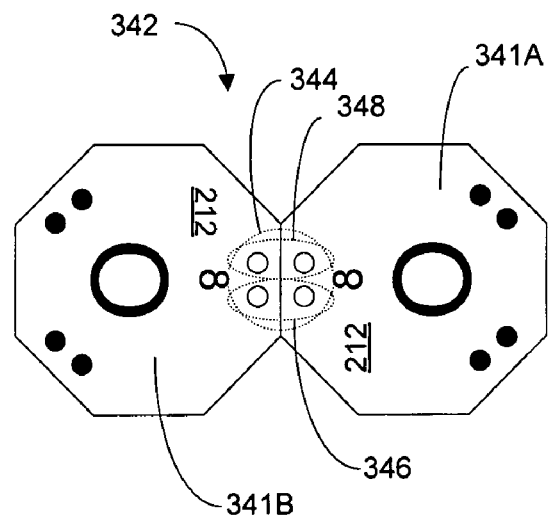
FIGS. 3B and 3C illustrate an oxygen molecule and a water molecule formed using the atomic tiles, in accordance with an embodiment of the present invention.
Figure 3C:
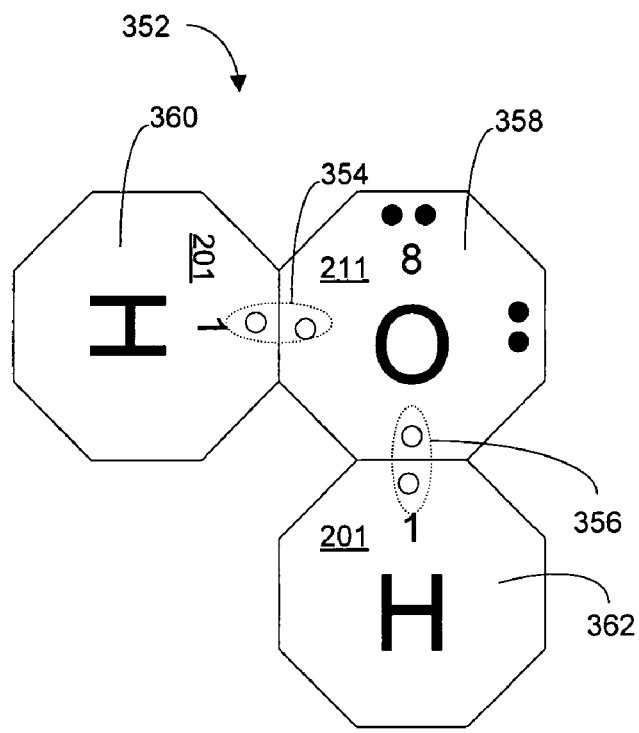

FIGS. 3B and 3C illustrate an oxygen molecule 342 and a water molecule 352 formed using the atomic tiles, in accordance with an embodiment of the present invention. The oxygen molecule 342 includes two oxygen tiles 212 used to form a double covalent bond 344. The double covalent bond 344 includes two shared electron pairs 346 and 348 that are shared by both oxygen atoms 341A and 341B.

The water molecule 352 includes two hydrogen tiles 201 and one oxygen tile 211. A first single covalent bond 354 includes a single par of shared electrons that are shared between the oxygen atom 358 and the first hydrogen atom 360. A second single covalent bond 356 includes a single pair of shared electrons that is shared between the oxygen atom 358 and the second hydrogen atom 362.

The atomic tiles 201-225 can be different colors to represent the colors of the respective elements. By way of example, the carbon tiles 204-207 can be black or dark grey as those are colors usually associated with carbon. Similarly, the oxygen tiles 211 and 212 can be, for example, red as that is the color associated with oxygen in some instances. It should be understood these are only exemplary colors and any color scheme for the atomic tiles 201-225 can be used.

The atomic tiles 201-225 can be formed from a range of materials, including, but not limited to, paper, cardboard, wood, metal, glass, plastic or some combination of materials. Atomic tiles 201-225 can be combined to create two-dimensional molecules as described in FIGS. 3A-C above. The atomic tiles 201-225 can be combined to create two or three-dimensional molecules.

Atomic tiles 201-225 make basic covalent bonding theory easily understandable by all age groups and education levels. The atomic tiles 201-225 can form the basis of a formal chemistry education tool at multiple educational levels. The atomic tiles 201-225 can be used in a game or puzzle that can easily and simply introduce covalent bonding theory.

In a formal educational setting, atomic tiles can serve as a hands-on and visual tool to explain basic dot theory. By way of example, the atomic tiles provide very intuitive and user friendly examples of molecule building. In a molecule building activity, for example, a student may be asked to build a molecular structure from a chemical formula using atomic tiles. A student will be faced with a number of choices to attempt and assess because some elements can have more than one configuration of valence electrons.

The atomic tiles also provide the opportunity to explore the dot theory rules. By way of example, atomic tiles intuitively lend themselves to guided inquiry-based lesson plans where students can deduce dot theory rules for themselves. Given an appropriate set of atomic tiles, a student could sort tiles by element. As mentioned above, some element have a variety of valence electron configuration that reflects the different ways that element can share electrons. Once sorted, students could observe trends among the elements and attempt to define rules or hypotheses that explain those trends.

The atomic tiles can also be incorporated into a game or puzzle. Chemistry novices can learn dot theory just by playing the game or solving the puzzle. By way of example, a competitive domino-like matching game can use the atomic tiles. The rules of the game are relatively simple and a player does not need to know anything about dot theory to play. As a player develops strategies to be competitive, they will begin to the learn dot rules that are imbedded within the tiles. The game can also reinforce fundamental principles of chemistry e.g., molecules are made from atoms.

One embodiment is a simple card game with chemical significance. Each card represents an element and has four attributes: Open dots, closed dot pairs, element symbol and point values. The open dots are the available valence electrons as described above. The open dots can be in singles, doubles, and triples. Closed dot pairs can be shown as overlapping black circles. Closed dot pairs represent electron pairs that are not available for covalent bonding. The element symbol is the scientific symbol for the element. The cards can also include a distinct color that corresponds to the element. By way of example carbon has the symbol C, and the color black, while oxygen has the symbol O and the color red. Each element has a point value associated with it. By way of example carbon can be worth 6 points while oxygen can be worth 8 points. A correct play matches the open dots. A single open dot is matched with a single open dot, a double open dot is matched to a double open dot and so forth. An atom is filled if all its open dots are matched. A molecule is completely filled if all the atoms in the molecule are filled.

Figure 4:
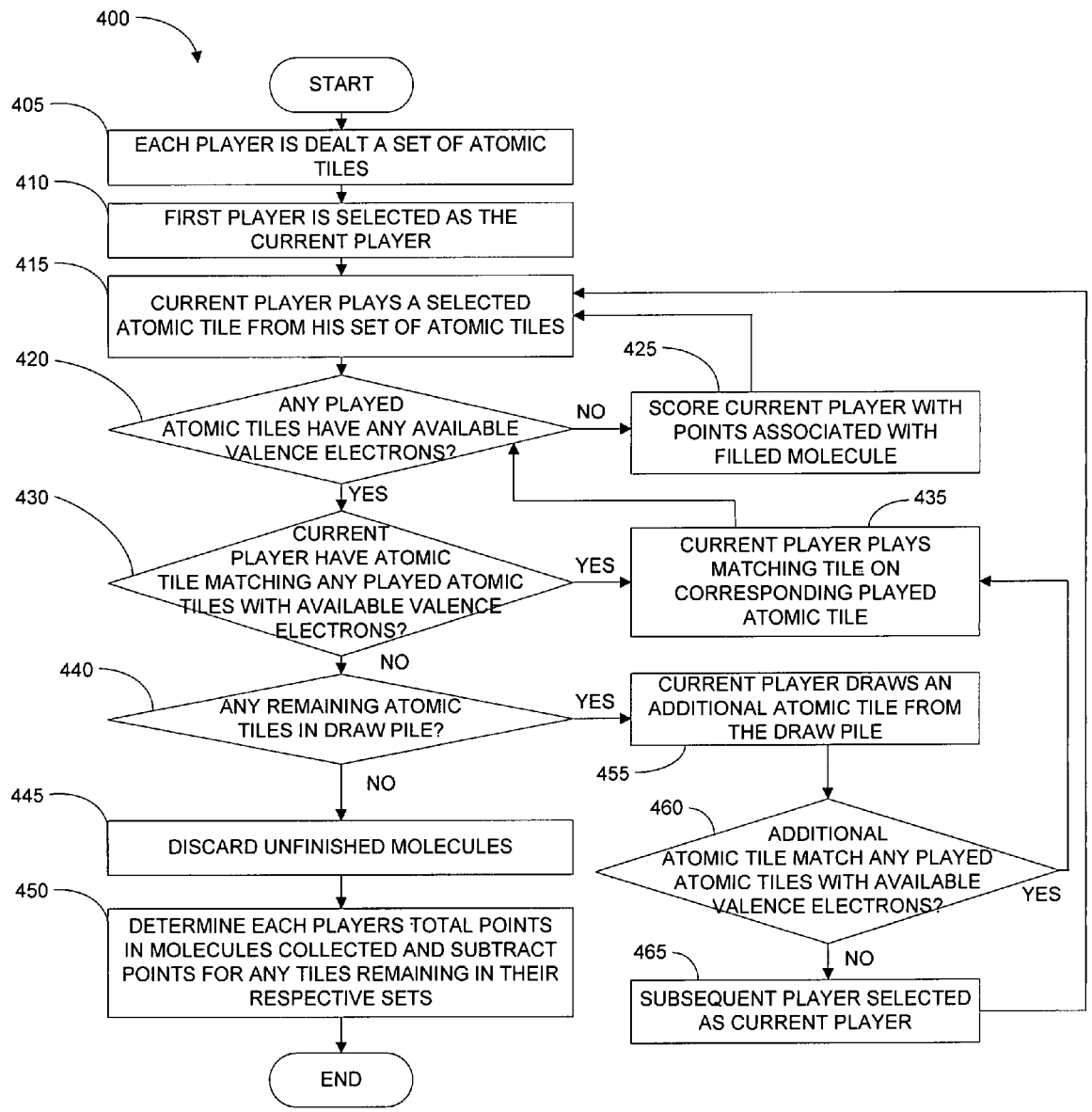
FIG. 4 is a flowchart of the method operations of playing the game, in accordance with an embodiment of the present invention.

FIG. 4 is a flowchart of the method operations 400 of playing the game, in accordance with an embodiment of the present invention. In an operation 405, each player is dealt a set of atomic tiles and the remaining atomic tiles are set aside in a draw pile. By way of example, each player can be dealt a set of five atomic tiles. It should be understood that more or less than five atomic tiles could be dealt as long as all players are dealt the same number of atomic tiles.

In an operation 410, a first player is selected as the current player. In an operation 415, the current player selects an atomic tile from the atomic tiles in his set and plays the selected atomic tile by placing the selected atomic tile face up for all players to see. In an operation 420, the played atomic tiles are examined to determine if at least one of the played atomic tiles has any available valence electrons.

If, in operation 420, none of the played atomic tiles has an available valence electron, then the played atomic tiles form a completely filled molecule. If the played atomic tiles form a completely filled molecule, then the method operations continue in an operation 425. In operation 425, the current player is scored with the points associated with the filled molecule and method operations continue in operation 415. By way of example, the filled molecule can be a total of the atom points. Alternatively, additional points or multiple of atom points can be awarded if the filled molecule is more complex. By way of example a filled molecule of four atoms may be given additional points over a molecule of two atoms.

Referring again to operation 420, if at least one of the played atomic tiles has an available valence electron, then the method operations continue in an operation 430. In operation 430, if one of the atomic tiles remaining in the current player's set has an edge matching one of the edges of the played atomic tile, then the current player can play the matching tile on one of the played atomic tiles in an operation 435 and the method operations continue in operation 420.

If none of the atomic tiles remaining in the current player's set has an edge matching one of the edges of the played atomic tiles, then in an operation 440, the draw pile is examined and if there are no remaining atomic tiles in the draw pile then the game ends and the method operations continue in operation 445. In operation 445, any unfinished molecules are discarded. In an operation 450, all players determine their total points in molecules they have collected and subtract the points for any atomic tiles remaining in their respective sets. The player with the most points wins and the method operations end.

If, in operation 440, there are any remaining atomic tiles in the draw pile and the method operations continue in an operation 455. In operation 455, the current player draws an additional atomic tile from the draw pile and adds the additional atomic tile to his set of tiles. In an operation 460, the additional tile is examined to determine if the additional tile has an edge matching one of the edges of the played atomic tiles, then the method operations continue in operation 435 as described above.

If the additional tile does not have an edge matching one of the edges of the played atomic tiles, then a subsequent player is selected as the current player in an operation 465 and the method operations continues in an operation 415 as described above. The subsequent player can be either a clockwise or counter-clockwise from the previous current player.

As described above, matching the atomic tiles could also be performed in a virtual manner in a computer game or other similar electronic representation of the atomic tiles.

In one embodiment, the atomic tiles can also be used to demonstrate formal charge and ionic bonding. By way of example the atomic tiles can include ion representations (e.g., +1, +2, −1, −2, etc.) to indicate a charge state of an atom. Similarly, the atomic tiles can be used to form ions. Atoms with formal charges can be used to form polyatomic ions.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An atomic tile comprising:
    an elemental symbol for a corresponding element;
    a fixed dot representation of at least one bonding valance electron of the corresponding element, wherein the dot representation are proximate to corresponding edges of the atomic tile; and
    a fixed dot representation of any corresponding non-bonding valence electrons, wherein the dot representation of at least one valence electron of the corresponding element includes:
        an open dot representing an available bonding valence electron; and
        a filled dot representing a non-bonding valence electron.

2. The atomic tile of claim 1, further comprising an atomic number corresponding to the element.

3. The atomic tile of claim 1, further comprising a point score corresponding to each one of a plurality of valence electron configurations.

4. The atomic tile of claim 3, wherein the plurality of valence electron configurations includes a single covalent bond.

5. The atomic tile of claim 3, wherein the plurality of valence electron configurations includes a double covalent bond.

6. The atomic tile of claim 3, wherein the plurality of valence electron configurations includes a triple covalent bond.

7. The atomic tile of claim 1, wherein the atomic tile includes a predefined geometrical shape.

8. The atomic tile of claim 7, wherein the geometrical shape has at least one side having a shape capable of being fitted to a second atomic tile.

9. The atomic tile of claim 8, wherein each of the atomic tile and the second atomic tile include at least one straight side.

10. The atomic tile of claim 7, wherein the geometrical shape includes an octagonal shape.

* * * * *